(12) United States Patent
Farb

(10) Patent No.: US 10,294,918 B2
(45) Date of Patent: May 21, 2019

(54) TURBINE RELATIONSHIPS IN PIPES

(75) Inventor: Daniel Farb, Beit Shemesh (IL)

(73) Assignee: Daniel Farb, Beitshemesh (IL)

(*) Notice: Subject to any disclaimer, the term of this patent is extended or adjusted under 35 U.S.C. 154(b) by 1336 days.

(21) Appl. No.: 13/057,768

(22) PCT Filed: Aug. 17, 2009

(86) PCT No.: PCT/IB2009/053611
§ 371 (c)(1),
(2), (4) Date: Feb. 7, 2011

(87) PCT Pub. No.: WO2010/020932
PCT Pub. Date: Feb. 25, 2010

(65) Prior Publication Data
US 2011/0140434 A1 Jun. 16, 2011

Related U.S. Application Data

(60) Provisional application No. 61/089,914, filed on Aug. 19, 2008.

(51) Int. Cl.
F04B 41/06 (2006.01)
F03D 3/06 (2006.01)

(52) U.S. Cl.
CPC ........ F03D 3/061 (2013.01); F05B 2240/301 (2013.01); Y02E 10/74 (2013.01); Y10T 137/0402 (2015.04)

(58) Field of Classification Search
None
See application file for complete search history.

(56) References Cited

U.S. PATENT DOCUMENTS

| | | | |
|---|---|---|---|
| 4,731,545 A * | 3/1988 | Lerner et al. | 290/54 |
| 8,348,623 B2 * | 1/2013 | Vasshus et al. | 417/3 |
| 2009/0090158 A1 * | 4/2009 | Davidson et al. | 72/369 |
| 2010/0140180 A1 * | 6/2010 | Powell | 210/710 |

* cited by examiner

*Primary Examiner* — Kayla McCaffrey

(57) ABSTRACT

The location of in-pipe turbines within a piping system and their relationships to other devices in the piping system is dependent on several factors for the ideal operation of these turbines, whether from the nozzle shooting liquid into air, or providing a stable pressure to the turbine and the generator. Several solutions to this issue are presented.

5 Claims, 3 Drawing Sheets

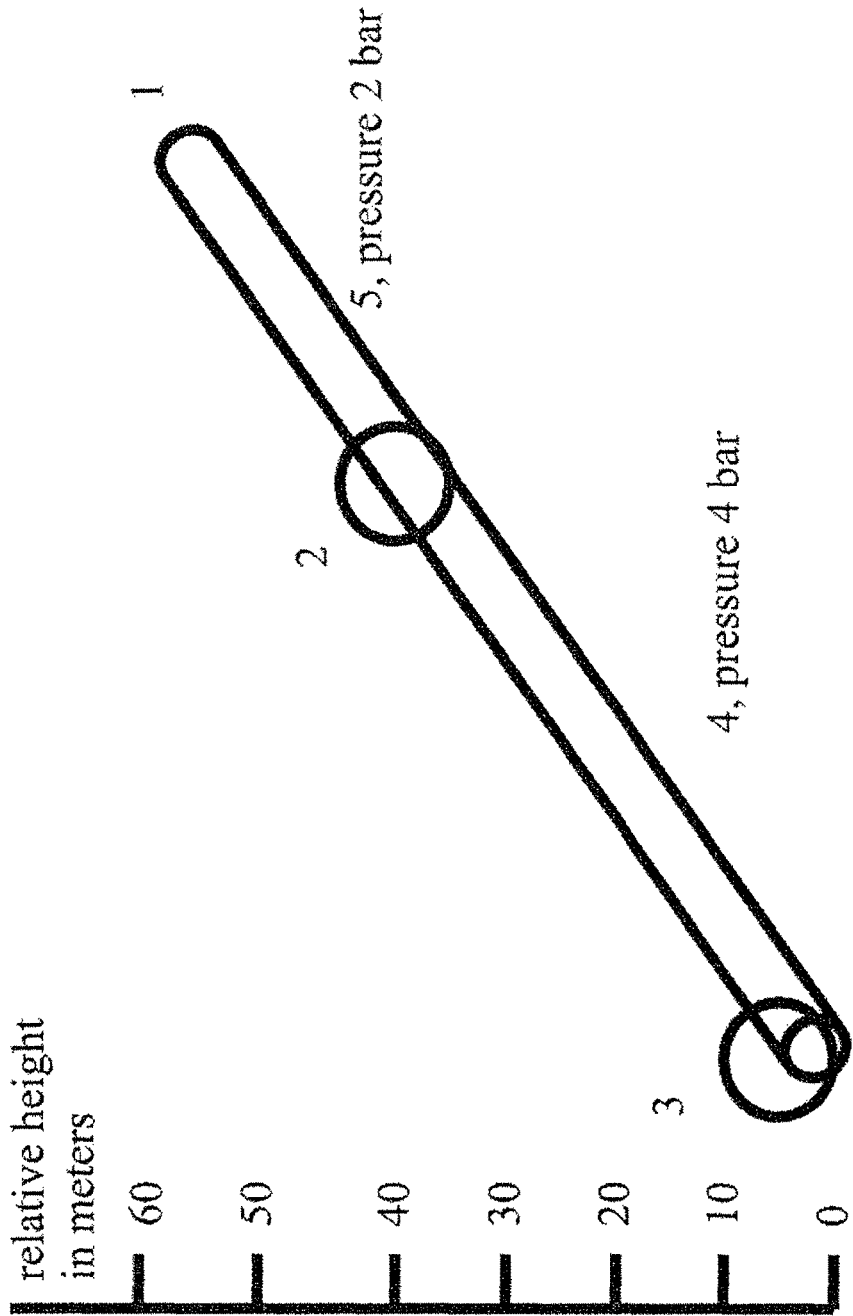

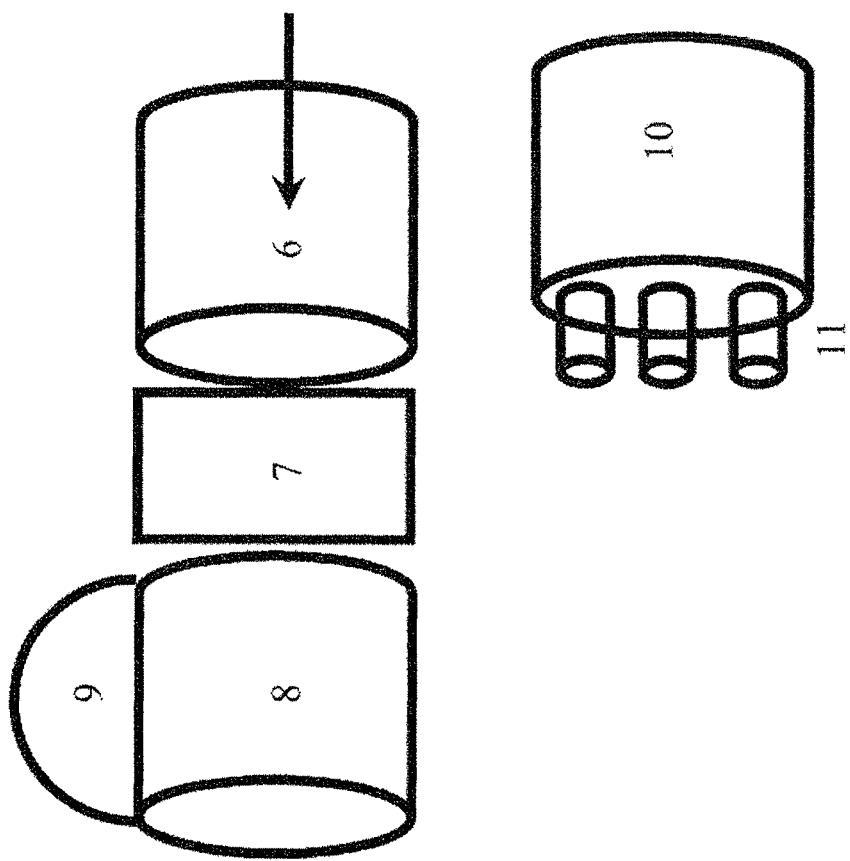
Figure 2 Valves and Diversions

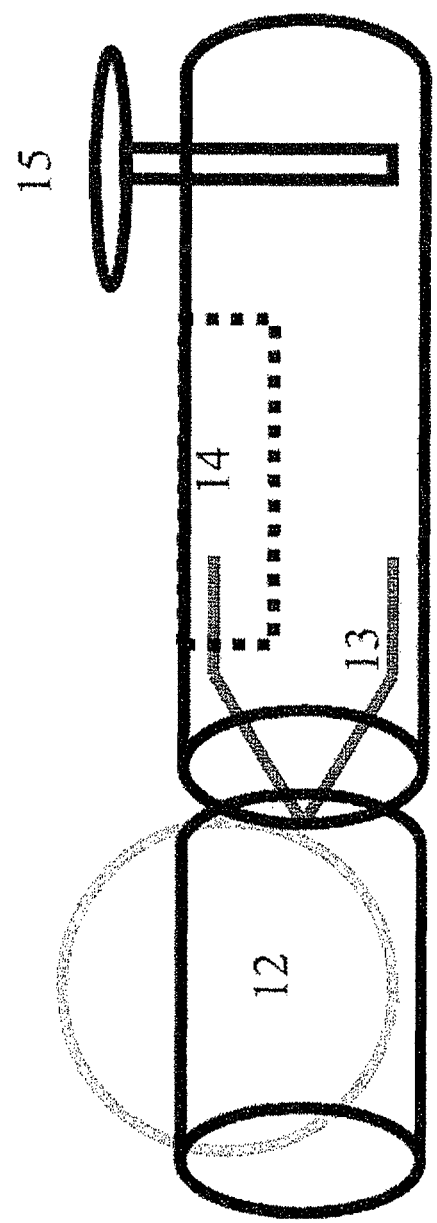

TURBINE RELATIONSHIPS IN PIPES

FIELD AND BACKGROUND OF THE INVENTION

The present invention relates to a method and system of maximizing the power production from an in-pipe turbine by placing the turbine at the correct location in the pipe.

One problem with a closed-system in-pipe turbine is the presence of water in the area of the turbine from the downstream pressure and the operation of the turbine, and this can even be a problem with open system turbines as well. This slows down the jet from the nozzle. There are some ways to improve the situation.

BRIEF DESCRIPTION OF THE DRAWINGS

The invention is herein described, by way of example only, with reference to the accompanying drawings, wherein:

FIG. 1 is a diagram of separation of turbines in a pipeline.
FIG. 2 is a diagram of valves and diversions.
FIG. 3 is a diagram of a nozzle insertion area.

DESCRIPTION OF THE PREFERRED EMBODIMENTS

The present invention deals with the relationship of turbines to other devices in a piping system.

The principles and operation of a series of at least one turbine in a piping system where the liquid is traveling down or where adjacent structures influence the pressure entering the turbine according to the present invention may be better understood with reference to the drawings and the accompanying description.

In the following descriptions, any fluid can be used; "water" is just mentioned because it is more common. The following also applies to oil and gas pipelines, for example.

Referring now to the drawings, FIG. 1 illustrates a downward falling pipe. One can see the device and method of placing turbines in a piping system so that the turbine area is not filled with water. That involves the placement of the turbine above the level of the head related to the pressure inside the pipe (1). If the pipe at the bottom (area 4) has 4 bars of pressure, then, from a turbine (3) at 0 meters relative height, placing the second turbine (2) at a relative elevation of 40 meters or more will enable it to function without the turbine area filling up with water. Then the turbine will be much more efficient The higher turbine (2) will then transfer 2 atmospheres of pressure (area 5) into energy. This is also claimed as a device including the pipe and at least one turbine with placement in a configuration where the turbine is placed in relation to the pressure in the system causing elevation of the water to be below the level of the turbine.

The same principles apply if there is another cause, other than a turbine, for a backing of pressure from the downstream point, so that a turbine in a downward segment should be placed above the point of the upper head from the back pressure. This could occur in a situation in which a downward segment is followed by an upward segment.

What would be a reason to separate turbines this way instead of placing one of higher capacity at the bottom? One answer is that there may be a local need along the way. Another is that the higher pressure from an uninterrupted flow in the pipe could cause leakage or other problems.

We introduce the use of a manifold and of pressure valves, with or without each other, in association with an in-pipe turbine in a piping system. FIG. 2 illustrates a conceptual outline of such a system. A pressure valve (location 7) upstream of a turbine (8) and downstream from a pipe (6) can enable a steady stream of constant velocity and the use of a synchronous generator (9) as one embodiment. The use of a manifold (10) enables the diversion of fluid into several pipes (11), each of which can utilize a smaller power generator. In addition, it enables diversion of flow for repairs.

In all these cases, a shut-off valve (not shown) upstream of the in-pipe turbine 8 is extremely useful, and is novel in combination with an-pipe turbine 8.

Creating an area of increased volume or diameter, such as a pool, downstream from the turbine, even within the piping system, helps create an area where the turbine is not filled with water and the jet from the nozzle can speed through air instead of water.

FIG. 3 shows a device for easy insertion of a nozzle into the turbine system. (12) is the turbine. (13) is a nozzle. Because the ability to change and replace different types of nozzles is important in this kind of turbine, an insertion hatch (14) in the adjacent pipe is crucial. (14) can be opened and closed shut. A shut-off valve (15) upstream of the hatch makes the placement easier. A means of locking the nozzle in place, such as by snapping or twisting into a complementary part in the pipe case, would be useful in that regard.

While the invention has been described with respect to a limited number of embodiments, it will be appreciated that many variations, modifications and other applications of the invention may be made.

SUMMARY OF THE INVENTION

The present invention successfully addresses the shortcomings of the presently known configurations by providing several configurations for obtaining the ideal arrangement for turbines in a piping system.

It is now disclosed for the first time a system of power generation in a piping system, comprising:
a. a downstream section of pipe,
b. a source of back pressure in said section,
c. an upstream in-pipe turbine located at an elevation greater than the head corresponding to the pressure (defined as, for example, 10 meters per atmosphere of pressure for water) of the lower, downstream section of pipe.
(The back pressure can be as simple as the pressure in the system, but it can also be from the turbine at the bottom with its nozzle that creates a certain level of head, combined with the flow rate, which allows water to accumulate above the nozzle. The upstream turbine should be, at least for a majority of the time, above the level of the contents so it can function at maximum efficiency.)

According to another embodiment, the source in the downstream section of pipe comprises a turbine.

According to another embodiment, the pipe contains non-water liquid.

According to another embodiment, the pipe contains solids.

It is now disclosed for the first time a method of placing turbines in a piping system with a downward section of pipe, wherein the upstream turbine active area is not filled with backed-up content from the downstream turbine.

It is now disclosed for the first time a method of manufacturing a piping system, wherein the placement of an upstream in-pipe turbine is above the level of the head of the downstream pressure.

It is now disclosed for the first time a method of constructing a piping system, wherein at least one turbine is used to reduce pressure in a segment of the piping system from above the pressure at which content leaks from a pipe to below the pressure at which content leaks from a pipe.

According to another embodiment, the content is non-water liquid.

It is now disclosed for the first time a piping system, comprising:

a. a pressure valve, b. a downstream and substantially adjacent in-pipe turbine.

According to another embodiment, the content is non-water liquid.

In one embodiment, the system further comprises c. a synchronous generator.

(The advantage of this is a cheaper generator that can operate from a steady supply of water.)

It is now disclosed for the first time a piping system, comprising:

a. a manifold, b. at least one in-pipe turbine, connected to the manifold.

13. The system of claim 12, wherein the content is non-water liquid.

14. The system of claim 12, wherein the content is solid.

It is now disclosed for the first time a piping system, comprising:

a. an in-pipe turbine, b. a shut-off valve substantially closely upstream of said turbine.

It is now disclosed for the first time a piping system, comprising:

a. an in-pipe turbine, b. an adjacent downstream region of increased cross-sectional area.

17. The piping system of claim 16, wherein the downstream area is a pool.

It is now disclosed for the first time an in-pipe turbine system, comprising:

a. a means for providing substantially constant flow from the nozzle into the turbine.

It is now disclosed for the first time an in-pipe turbine system, comprising:

a. an insertion means for a removable nozzle upstream of the turbine via a detachable chamber upstream of the turbine.

In one embodiment, the system further comprises:

b. a means of locking a removable nozzle into place

In one embodiment, the system further comprises b. a shut-off valve upstream to the nozzle insertion point.

What is claimed is:

1. A system of power generation in a piping system, comprising:

a. a downstream section of pipe, b. a source of backpressure in said section from a fluid with a head, c. an upstream section of pipe including a manifold, the manifold in communication with the downstream section of pipe, and a hydroelectric turbine located within the upstream section of pipe, at an elevation greater than the head, corresponding to the pressure in the downstream section of pipe, d. a nozzle upstream from the hydroelectric turbine, and, e. a pressure valve upstream of the nozzle leading to the hydroelectric turbine for enabling a steady fluid stream of constant pressure through the hydroelectric turbine.

2. The system of claim 1, wherein the pipe contains non-water liquid.

3. The system of claim 1, further comprising f. a synchronous generator.

4. The system of claim 1, additionally comprising: a detachable opening in the upstream section of pipe adjacent to the nozzle.

5. The system of claim 1, additionally comprising: a shut off valve upstream of the nozzle.

\* \* \* \* \*